A. KONIECZNY.
PHOTOGRAPHIC PROJECTION APPARATUS.
APPLICATION FILED JULY 21, 1915.
1,346,319.
Patented July 13, 1920.
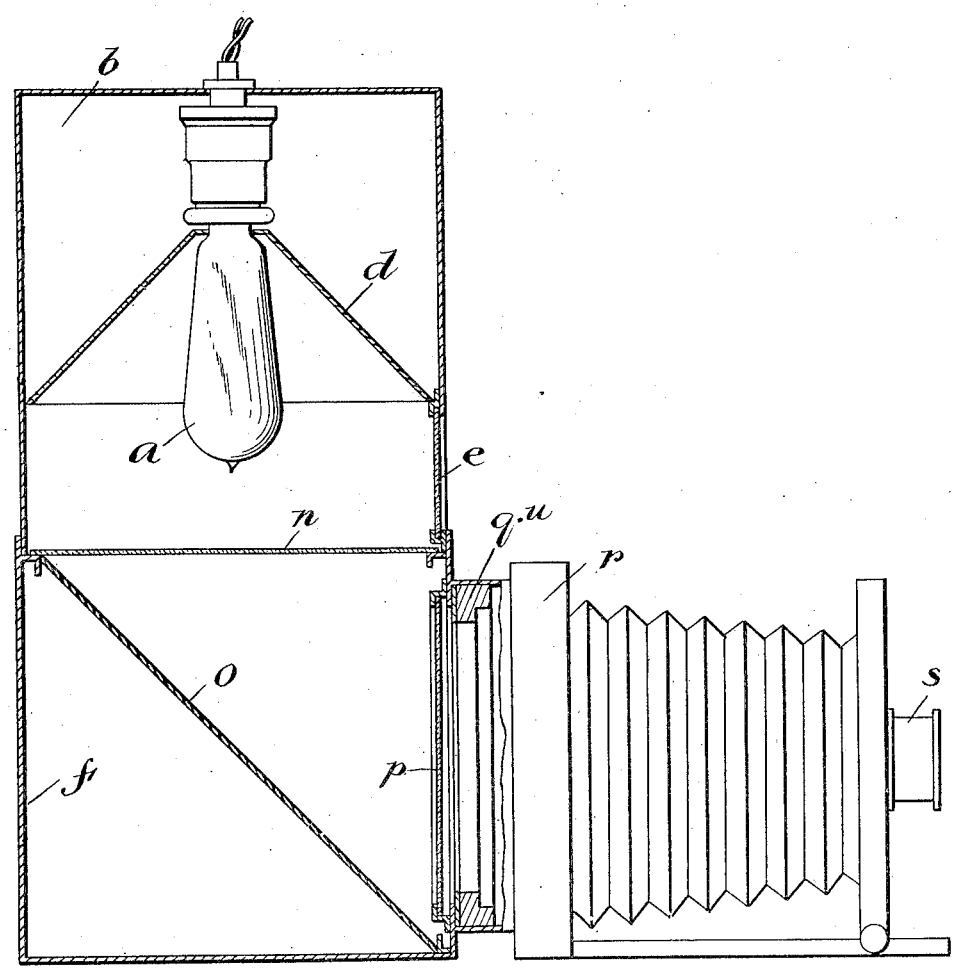
Inventor:
Anton Konieczny
by Henry Orth
Atty

UNITED STATES PATENT OFFICE.

ANTON KONIECZNY, OF VIENNA, AUSTRIA.

PHOTOGRAPHIC PROJECTION APPARATUS.

1,346,319.

Specification of Letters Patent.

Patented July 13, 1920.

Application filed July 21, 1915. Serial No. 41,148.

*To all whom it may concern:*

Be it known that I, ANTON KONIECZNY, laboratory assistant, Vienna VI, Mariahilferstrasse 55, Austria, have invented a new and useful Improvement in Photographic Projection Apparatus, of which the following is a full, clear, and exact description, reference being had to the accompanying drawings, making part of this specification.

My invention relates to a photographic projecting apparatus, adapted more especially for enlarging pictures.

In devices for this general purpose, with which I am familiar, it has been necessary to employ extremely expensive condenser lenses in order to obtain a fairly uniform distribution of light to the picture to be enlarged. In a great many cases the cost of such lenses makes the work almost prohibitive.

Moreover the effect produced is not always satisfactory, as frequently the details of the picture are lost in the enlarging process, and the lights and shadows are extremely poorly reproduced.

The principal object of my invention is to provide a simple apparatus, which may be produced at a very moderate cost, and by means of which faithful enlargements may be obtained even by those not skilled in the photographic art.

Stated briefly, the object of my invention is accomplished by providing within a suitable case a substantially elongated source of light coaxial with and surrounded by a rectangular conical reflector. As an adjunct to the combination of the elongated source of light with the reflector, I may and usually do use a mirror between the light source and the negative for the purpose of directing the rays of light to the latter.

The preferred embodiment of the invention is illustrated in the accompanying drawing which shows a schematic view of the device, parts appearing in section.

Referring to the drawing, $b$ denotes a casing of any suitable form having suspended therein an elongated source of light $a$. Any suitable source of light may be employed, although in the present instance an electric bulb is disclosed. Surrounding the source of light $a$ and co-axial therewith is a reflector $d$ which is rectangular in cross section and is cone shaped, with the apex of the cone at the upper end of the source of light $a$.

The lower end of the casing $b$ may be provided with an opening which is closed by a red glass window $e$ through which the action of the device may be observed.

Adapted to be connected with the casing $b$ is a lower casing $f$ near the upper end of which may be supported a ground glass plate $n$, and resting within the casing $f$ at an angle of approximately 45° is a mirror $o$ which is used to direct the rays of light emanating from the source $a$, in the direction of the negative.

At the front of the casing $f$ a photographic frame $q$ $u$ is supported, the latter carrying the negative $p$ of which an enlargement is desired. In line with the frame $q$ $u$ is a camera $s$ of any suitable construction, and it will be apparent that the rays of light issuing from the source $a$ are thrown by the reflector $d$ against the mirror $o$ and by the latter are directed in parallel lines against the negative $p$ which is enlarged by means of the camera $s$.

The ground glass $n$ may be omitted if desired. If it be desired that the enlargement have clear sharp lines the ground glass $n$ is not used, but if softened tones be aimed at then the ground glass $n$ is employed in the position shown in the drawing.

What I claim is:—

1. A photographic projecting apparatus for the purpose specified, comprising a casing, an elongated source of light thereon, and a reflector surrounding and coaxial with said source of light, said reflector consisting of an upper wall at right angles to the axis of the source of light and a lateral wall at an obtuse angle to the upper wall.

2. A photographic projection apparatus as specified, comprising a casing, an elongated source of light therein and a conical reflector surrounding and co-axial with said source of light, said reflector having an apex angle of ninety degrees.

In testimony whereof I have signed my name to this specification in the presence of two subscribing witnesses.

ANTON KONIECZNY.

Witnesses:
RUDOLF THEUMERZ,
ARTHUR HERZOG.